US006911076B2

(12) United States Patent
Keshmiri

(10) Patent No.: US 6,911,076 B2
(45) Date of Patent: Jun. 28, 2005

(54) CEMENTITIOUS BASED STRUCTURAL LUMBER PRODUCT AND EXTERNALLY REINFORCED LIGHTWEIGHT RETAINING WALL SYSTEM

(76) Inventor: Firouzeh Keshmiri, 9763 S. 35th St., Franklin, WI (US) 53132

(*) Notice: Subject to any disclaimer, the term of this patent is extended or adjusted under 35 U.S.C. 154(b) by 0 days.

(21) Appl. No.: 10/649,981

(22) Filed: Aug. 26, 2003

(65) Prior Publication Data

US 2004/0144059 A1 Jul. 29, 2004

Related U.S. Application Data

(60) Division of application No. 10/072,785, filed on Feb. 8, 2002, which is a continuation-in-part of application No. 09/286,083, filed on Apr. 5, 1999, now abandoned.
(60) Provisional application No. 60/267,758, filed on Feb. 9, 2001.

(51) Int. Cl.[7] ......................... C04B 38/02; C04B 22/04; C04B 18/06; C04B 16/07; C04B 16/12; C04B 14/38; C04B 14/44
(52) U.S. Cl. ........................ 106/642; 106/672; 106/674; 106/676; 106/677; 106/679
(58) Field of Search ................................ 106/642, 672, 106/674, 676, 677, 679

(56) References Cited

U.S. PATENT DOCUMENTS

| | | | | | |
|---|---|---|---|---|---|
| 1,375,955 | A | | 4/1921 | Eldridge | |
| 1,429,451 | A | | 9/1922 | Pease | |
| 1,615,815 | A | | 1/1927 | Birdsey | |
| 1,618,886 | A | | 2/1927 | Peterson | |
| 2,089,941 | A | | 8/1937 | Burson | |
| 2,153,837 | A | | 4/1939 | Hybinette | |
| 2,156,311 | A | | 5/1939 | Schuh | |
| 2,205,735 | A | * | 6/1940 | Scherer, Jr. | 106/642 |
| 3,495,371 | A | | 2/1970 | Mitchell, Jr. | |
| 3,857,217 | A | | 12/1974 | Reps | |
| 3,922,828 | A | | 12/1975 | Patton | |
| 3,979,217 | A | * | 9/1976 | Sutton | 106/675 |
| 4,066,723 | A | | 1/1978 | King et al. | |
| 4,132,555 | A | | 1/1979 | Barrable | |
| 4,257,993 | A | | 3/1981 | Schemel | |
| 4,306,395 | A | | 12/1981 | Carpenter | |
| 4,351,670 | A | | 9/1982 | Grice | |
| 4,372,092 | A | | 2/1983 | Lopez | |
| 4,465,719 | A | | 8/1984 | Grice | |
| 4,504,320 | A | * | 3/1985 | Rizer et al. | 106/708 |
| 4,563,851 | A | | 1/1986 | Long | |
| 4,570,398 | A | | 2/1986 | Zimmerman | |
| 4,751,803 | A | | 6/1988 | Zimmerman | |
| 4,923,664 | A | | 5/1990 | Kossatz et al. | |
| 5,002,620 | A | | 3/1991 | King | |
| 5,022,211 | A | | 6/1991 | Scott | |
| 5,108,679 | A | | 4/1992 | Rirsch et al. | |
| 5,112,405 | A | | 5/1992 | Sanchez | |
| 5,308,696 | A | * | 5/1994 | Hanashita et al. | 428/357 |
| 5,350,554 | A | | 9/1994 | Miller | |
| 5,391,245 | A | | 2/1995 | Turner | |
| 5,402,612 | A | | 4/1995 | diGirolamo et al. | |
| 5,479,751 | A | | 1/1996 | White | |
| 5,482,550 | A | * | 1/1996 | Strait | 106/677 |
| 5,494,513 | A | | 2/1996 | Fu et al. | |
| 5,573,348 | A | | 11/1996 | Morgan | |
| 5,642,594 | A | | 7/1997 | Sucre | |
| 5,685,124 | A | | 11/1997 | Jandl, Jr. | |
| 5,707,474 | A | | 1/1998 | Andersen et al. | |
| 5,758,463 | A | | 6/1998 | Mancini | |
| 5,758,464 | A | | 6/1998 | Hatton | |
| 5,772,751 | A | * | 6/1998 | Nisnevich et al. | 106/679 |
| 5,865,001 | A | | 2/1999 | Martin et al. | |
| 5,897,703 | A | | 4/1999 | Halakeyama et al. | |
| 6,003,276 | A | | 12/1999 | Hegemier et al. | |
| 6,003,278 | A | | 12/1999 | Weaver et al. | |
| 6,030,446 | A | * | 2/2000 | Doty et al. | 106/677 |
| 6,061,995 | A | | 5/2000 | Menchetti et al. | |
| 6,145,260 | A | | 11/2000 | Morton | |
| 6,237,292 | B1 | | 5/2001 | Hegemier et al. | |
| 6,260,320 | B1 | | 7/2001 | Di Lorenzo | |
| 6,427,406 | B1 | | 8/2002 | Weaver et al. | |
| 6,773,500 | B1 | * | 8/2004 | Creamer et al. | 106/672 |

FOREIGN PATENT DOCUMENTS

| | | |
|---|---|---|
| CA | 2274287 | 6/1999 |
| WO | WO 9958789 | 11/1999 |

* cited by examiner

*Primary Examiner*—David Brunsman
(74) *Attorney, Agent, or Firm*—Michael Best & Friedrich LLP

(57) ABSTRACT

The invention includes a method for constructing buildings using non-wood construction products and buildings constructed from such non-wood construction products. The invention further includes a method and apparatus for manufacturing high-performance fiber-reinforced cellular concrete (HPFRCC) products and the use of such products as replacements for conventional wood lumber construction products. The products of the invention have the necessary strength, durability, nailability, and sawability for direct substitution for dimensional wood lumber in wood-frame construction applications. The invention also includes externally reinforced retaining wall systems that include stackable blocks formed of fiber-reinforced cellular concrete.

16 Claims, 5 Drawing Sheets

CEMENTITIOUS BASED STRUCTURAL LUMBER PRODUCT AND EXTERNALLY REINFORCED LIGHTWEIGHT RETAINING WALL SYSTEM

REFERENCE TO RELATED APPLICATIONS

This application is a divisional of U.S. application Ser. No. 10/072,785, filed Feb. 8, 2002, which is a continuation-in-part of U.S. application Ser. No. 09/286,083, filed on Apr. 5, 1999 now abandoned, and which claims the benefit of prior now abandoned U.S. Provisional Application No. 60/267,758, filed on Feb. 9, 2001. The entire contents of these applications are hereby incorporated by reference herein.

BACKGROUND OF THE INVENTION

1. Field of the Invention

The invention relates to non-wood products for use in construction and for use as substitutes for dimensional lumber or corresponding engineered wood products and in the same applications and dimensions as wood lumber products.

The invention also relates to retaining wall systems, and more particularly to reinforced retaining wall systems.

2. Background Prior Art

In the United States, wood lumber products have formed the primary structural elements or building materials for many types of construction, especially in the single- and multi-family housing sector. A large segment of the U.S. home construction industry revolves around the use of common wood lumber framing systems for walls comprising 2×4's or 2×6's placed on 16-inch centers and floors constructed of 2×10's on 16-inch centers. Skilled labor has been trained to assemble these specific types of framing. Special equipment has also been designed and manufactured to perform and speed up the process of assembly. Therefore, any proposed changes in construction techniques that seek to significantly alter established construction practices would not be viewed favorably by the construction industry nor the marketplace. For years, lumber has been abundant and relatively inexpensive. Also, its natural structural properties and its ease of manufacture have assured its dominant position. However, with the growth of the economy, dwindling forest resources, and the emerging significance of global environmental issues such as the greenhouse effect, there is a need to re-assess the widespread use of wood-based products in building construction.

Over the years, many substitute building construction products have been brought into the market with varying degrees of success. However, none of these products are compatible with current methods and techniques for wood frame construction, the large pool of labor skilled in wood-frame construction, and the equipment developed and available to that industry. New concepts have either attempted to change the construction and structural system altogether, or required construction workers to learn new skills and use new forms of equipment to perform the construction work. These prior art concepts also affected conventional ways of handling other aspects of construction such as plumbing and electrical work. For example, replacing the wood frame wall concept with conventional concrete walls or Insulated Concrete Form (ICF) walls requires construction workers skilled in concrete forming, placement, and curing; affects the way the electrical and plumbing work is done; and results in a wall system far heavier than the corresponding wood frame system. Heavier building elements result in higher inertia forces during earthquakes. Walls built with conventional cellular concrete blocks or panels are lighter, but have very low compressive strengths. Because of their brittleness, their response to lateral loading caused by earthquakes in seismic zones or caused by hurricanes or other strong winds is an area of major concern.

Steel studs have been developed and used to approximate wood frame construction. These hollow studs are made of cold-formed steel. They are generally not nailable, although metal screws are used. They are generally not sawable in the field and need to be pre-cut to exact lengths. In contrast to the relative flexibility afforded plumbers or electricians in wood-frame buildings, the steel stud frames have pre-placed positions for the passage of plumbing or electrical hardware. Due to the high thermal conductivity of steel, ghost shadowing, which comprises the appearance of a shadow of the metal stud on the gypsum board wall, has also been a problem. Steel studs can also be susceptible to local or general buckling when subjected to extreme loads or heat.

U.S. Pat. No. 5,479,751 discloses a method and apparatus for fabrication of wood substitute products containing cement and synthetic resin. The disclosed product is described as having sawability and fastener-holding properties. The product includes an outermost casing (hollow tubular body) which is filled with cement and resin. Because the cement mixture inside the tube is not reinforced for tensile stresses, the casing provides that structural function. Because it is common practice to remove parts of the dimensional lumber for fitting and other purposes in wood-frame construction, any cutting of the casing in this product would compromise the structural integrity of the member.

Aerated cellular concrete is a light-weight cement-based product that has been used in some concrete houses. A few commercial manufacturers produce cellular concrete blocks and panels in the United States. However, the structural systems used in such cases are typically based on load-bearing walls, which is a significant departure from framing systems used in wood houses. Cellular concrete is both sawable and nailable. However, special nails are generally recommended to provide nail pull-out capacities. The strength of common cellular concrete is relatively low. Because of its brittleness, fabrication of members such as 2×4's from cellular concrete is not feasible because they would easily break. In general, the ingredients of cellular concrete include Portland cement, silica sand, lime, water, and a foaming agent which is typically aluminum powder. Cellular concrete plants use autoclaves to cure the cast blocks.

The prior art also includes fiber-reinforced concrete, and significant research has been performed particularly in the last decade on various applications of fiber-reinforced concrete including the use of fiber-reinforced cellular concrete building panels for construction of an envelope surrounding buildings for protection against hurricane-induced missiles. Fiber reinforced cellular concrete has included polypropylene fibers added to cellular concrete to produce 4-in. thick panels. Although this material exhibits improved toughness and ductility which are good properties against missile impact, its compressive strength is low (250 psi or approximately 1/20th of conventional concrete).

U.S. Pat. No. 5,002,620 discloses a laminated or sandwiched panel system in which layers of fiber-reinforced concrete are cast against each other. The layers include a dense layer without air bubbles sandwiched with a lighter layer of cellular concrete. A vapor barrier is placed between the two mating layers. The dense layer of non-cellular material serves as the structural, load carrying element while the cellular layer provides insulation qualities. The fiber-reinforced cellular material discussed in U.S. Pat. No. 5,002,620 does not provide the necessary structural strength to permit use of this product in the form of dimensional lumber and as a primary structural element.

It is important to realize that in wood-frame construction, the imposed loads are being carried by the relatively small cross-sectional areas of the 2×4's or 2×6's as opposed to a wall system where a relatively large area and moment of inertia supports the load. Stress levels are far higher in dimensional lumber members than in a wall system. This substantially increases the strength requirements for the dimensional lumber member. The increased strength must be accommodated in the design of the lumber member. In addition to the strength issue, the nailability, sawability, and weight issues are other restricting factors in a dimensional lumber member. For example, the likely result of attempts to increase compressive strength would be a reduction in nailability and sawability, and an increase in weight. Attempts to increase tensile strength through addition of more fibers leads to dispersion problems and other issues that must be resolved.

U.S. Pat. No. 4,351,670 and U.S. Pat. No. 4,465,719 disclose methods of making, and structural elements incorporating, a lightweight concrete. The lightweight aggregates for this concrete consist of broken-up pieces of cellular concrete that are coated with cement slurry. This material does not include fibers, and can be cast in a casing to form a composite building element. This invention is intended to introduce a new source of lightweight aggregate for concrete.

U.S. Pat. No. 5,685,124 discloses a folded plate panel using boards made of wood. Veneers are attached to one or both sides of the ridges of the folded plate. The hollow spaces thus created are filled with sound- and heat-insulating materials. Lightweight concrete and foamed concrete can be used as insulation filling the hollow spaces. The concrete is not intended to serve a structural function in this invention.

U.S. Pat. No. 2,156,311 discloses a "cement-fibrous" lightweight material with fireproof and waterproof properties based on wood pulp and cement. The patent describes a manufacturing process involving filtering to remove water and roller forming of cement panels. This material is not an aerated cellular concrete.

U.S. Pat. No. 2,153,837 discloses the addition of a small amount of wood pulp to achieve uniformity in cellular concrete walls. The wood pulp is not intended to serve a structural function, but to ensure uniformity of the final product.

Segmented retaining wall systems generally consist of heavy weight concrete or stone blocks placed in layers such that each layer is set back a small distance with respect to the layer below. These systems are referred to as "gravity walls" and typically include blocks that have an interlock device such as a flange or projection on the bottom face of a block that locks with a groove, slot, or mating surface on the top face of a lower stacked block.

Stability of the retaining wall is dependent on the mass of the wall and the amount of setback between stacked blocks. The weight of the backfill behind the retaining wall creates a moment to overturn the retaining wall, a force to slide the base out relative to the ground, and a force to slide each individual layer of main blocks out relative to an adjacent block. The overturning moment is resisted by the weight of the wall, and the sliding forces are resisted by friction between the underside of the base block and the soil and the friction and the interlocking device between adjacent layers of the blocks.

Cast-in-place reinforced concrete cantilever wall systems typically include internal steel bars that provide the necessary strength along the height of the wall. The cast-in-place wall systems generally include a continuous reinforced concrete footing under the wall to distribute the overturning moment and sliding forces to the surrounding backfill. The stability of the wall is dependent on the overall weight of the wall and the weight of the portion of the backfill that is resting directly on top of the footing.

These conventional concrete retaining walls are susceptible to cracking due to poor freeze-thaw durability. The concrete blocks used in the conventional retaining walls are difficult to handle and transport because they are generally heavy and brittle resulting in increased handling costs. Specifically, these blocks typically weigh approximately 150 pounds per cubic foot and will likely shatter when dropped from a relatively small distance onto a hard surface.

SUMMARY OF THE INVENTION

The invention includes a method for constructing buildings using non-wood construction products and buildings constructed from such non-wood construction products. The invention further includes a method and apparatus for manufacturing high-performance fiber-reinforced cellular concrete (HPFRCC) products and the use of such products as replacements for conventional wood lumber construction products. The products of the invention have the necessary strength, durability, nailability, and sawability for direct substitution for dimensional wood lumber in wood-frame construction applications.

More particularly, the invention includes cement-based HPFRCC products for use in direct substitution of dimensional lumber such as 2×4's, 2×6's, 2×10's, etc. which are typically used in wood-frame construction. The construction products embodying the invention have load capacities in flexure, compression, tension, and shear equaling or exceeding the corresponding values for stud grade lumber commonly used in construction. The geometries of the developed products can be identical to the corresponding conventional wood products. The products embodying the invention can also be made in a variety of shapes and sizes other than dimensional lumber sizes and shapes. They are nailable using common nails, with nail pull-out capacities comparable to wood, and sawable using common hand saws or electric saws. The basic material used in the products has approximately half the weight of conventional concrete, with substantially increased toughness, energy absorption capability, and ductility (ability to stretch without rupture, or squeeze without disintegration) when compared to conventional concrete or wood. The product embodying the invention has excellent insulation properties, is not susceptible to long-term deterioration due to termites or other harmful parasites affecting timber products, does not suffer from common lumber imperfections such as knots, is fire resistant, and can be made in a variety of colors, lengths, and assemblies. The product also has the unique potential of maintaining and using conventional methods and equipment for wood frame construction (walls, floors, decking, etc.) without the need to further jeopardize dwindling, environmentally-crucial global forest product or timber resources. It also offers options for pre-fabricated framing panels for assembly at the building site.

One embodiment of the present invention is a lumber product for use in building construction. The lumber product includes fiber-reinforced cellular concrete made from a cementitious material, water, fiber, and an aerating material. The lumber product is an elongated rigid element of lumber-industry-standard dimensions. The cementitious material makes up approximately less than about 83% of the total weight of the lumber product, the water makes up approximately less than about 30% of the total weight of the lumber product, the fiber makes up approximately less than 4% of the total weight of the lumber product, and the aerating material makes up approximately less than 1% of the total weight of the lumber product.

In other embodiments, the cementitious material is either flyash or cement, the aerating compound is either aluminum powder or a foaming agent, the fiber is either carbon, polypropylene, alkali-resistant glass, or cellulose.

In another embodiment of the invention, the cementitious material includes cement, fly ash and silica fume or other pozzolans. The cement makes up approximately less than about 40% of the total weight of the lumber substitute product, the fly ash makes up approximately less than about 50% of the total weight of the lumber substitute product, and the silica fume or other pozzolans makes up approximately less than about 25% of the total weight of the lumber substitute product.

An additional embodiment of the invention is directed to a frame assembly for use in construction of a building. The frame assembly includes a pair of elongated liner structural members positioned in spaced apart relationship and at least one elongated linear structural member extending between the spaced apart pair of elongated linear structural members. At least one of the elongated linear structural members is formed from a non-laminated, substantially homogenous fiber reinforced cellular concrete.

Another embodiment includes a lumber substitute product for use in building construction. The lumber substitute product includes fiber-reinforced cellular concrete made from cement which makes up approximately 18–40% of the total weight of the product, fly ash which makes up approximately less than about 50% of the total weight of the product, silica fume or other pozzolans which makes up approximately less than about 25% of the total weight of the product, water which makes up approximately 20–30% of the total weight of the product, fiber which makes up approximately 0.4–3.2% of the total weight of the product, and an aerating material.

Other embodiments include sand which makes up approximately less than about 40% of the total weight of the product, a water-reducing admixture which makes up approximately less than about 0.6% of the total weight of the product, a color pigment which makes up approximately less than about 3.5% of the total weight of the product.

In still other embodiments, the aerating material is either aluminum powder or a foaming agent, and the fiber is either carbon, polypropylene, alkali-resistant glass, cellulose, nylon, aramid, acrylic, polyethylene, polyvinyl alcohol or polyolefin. More specifically, the aerating material is an aluminum power which makes up about 0.012–0.048% of the total weight of the product.

The invention also includes an externally reinforced lightweight retaining wall system comprised of stackable blocks formed of the high performance cellular concrete. These blocks are lightweight and durable for easier handling and reduced breakage during handling and transportation. The blocks of the present invention have an improved freeze-thaw durability and allow for saw cutting in the field to fit desired dimensions. The blocks of the present invention can be fastened to external reinforcements with common fasteners, and are available with decorative features and in a variety of integrated colors.

The present invention is directed to an externally reinforced retaining wall system that includes a base block, main blocks that are stacked above the base block, and a reinforcing strip that is fastened to the back faces of the main blocks and the top face of the base block to maintain and secure the stack of the retaining wall system. The blocks are made from a lightweight, durable, and workable material that allows the reinforcing strips to be attached to the blocks by common fasteners.

More specifically, one embodiment of the retaining wall system includes a base and a wall assembly. The base is formed from a first row of building blocks. The wall assembly is supported on the base, the wall assembly includes a plurality of vertically stacked rows of building blocks. The wall assembly has a front face and a rear face. The building blocks are formed of fiber reinforced cellular cementitious material. The retaining wall system also includes a plurality of spaced apart elongated vertically extending reinforcing strips fixed to one of the front face and the rear face of the wall assembly. The reinforcing strips are each secured to the wall assembly by a plurality of fasteners. The fasteners each extend through the reinforcing strips and into the building blocks forming the wall assembly.

Other embodiments of the retaining wall system include fiber reinforced cellular cementitious material made from cementitious material mixed with water, fiber and aerating material. In another embodiment of the invention, the cementitious material makes up approximately less than about 83% of the total weight of the building blocks, the water makes up approximately less than about 30% of the total weight of the building blocks, the fiber makes up approximately less than 4% of the total weight of the building blocks, and the aerating material makes up approximately less than 1% of the total weight of the building blocks.

Further embodiments of the invention include cementitious material that includes cement, fly ash and silica fume or other pozzolans. The cement makes up approximately less than about 40% of the total weight of the building blocks, the fly ash makes up approximately less than about 50% of the total weight of the building blocks, and the silica fume or other pozzolans makes up approximately less than about 25% of the total weight of the building blocks.

Other embodiments of the retaining wall system include fiber-reinforced cellular cementitious material that is made from cement which makes up approximately 18–40% of the total weight of the building blocks, fly ash which makes up approximately less than about 50% of the total weight of the building blocks, silica fume or other pozzolans which makes up approximately less than about 25% of the total weight of the building blocks, fiber which makes up approximately 0.4–3.2% of the total weight of the building blocks, and an aerating material.

Other features and advantages of the invention will become apparent to those skilled in the art upon review of the following detailed description, claims, and drawings.

Figure 1:
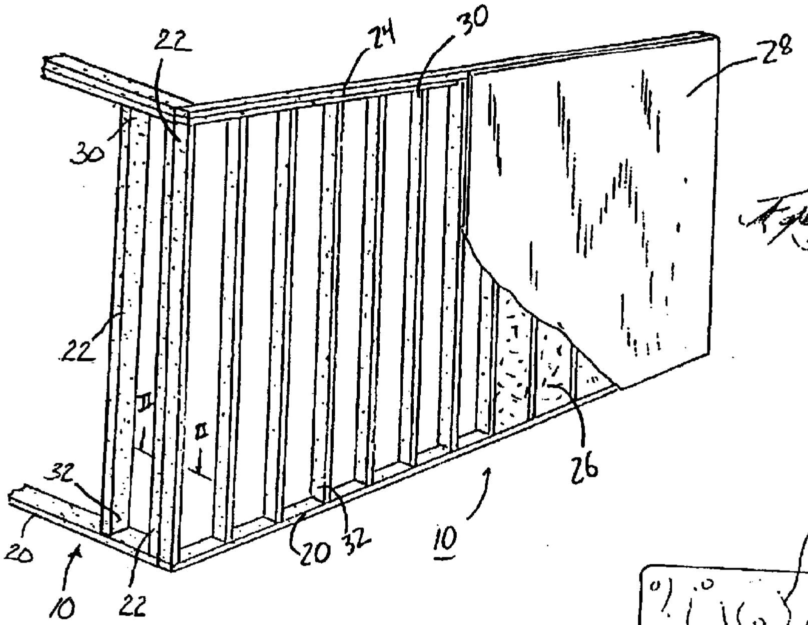
FIG. 1 shows a wall frame system embodying the invention.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items. The use of "consisting of" and variations thereof herein is meant to encompass only the items listed thereafter. The use of letters to identify elements of a method or process is simply for identification and is not meant to indicate that the elements should be performed in a particular order.

DESCRIPTION OF THE PREFERRED EMBODIMENTS

FIG. 1 illustrates a frame assembly 10 for use as a structural component of a building, such as a wall.

The frame assembly 10 includes a plurality of studs 22 that are spaced-apart and fastened to a sole plate 20 by nailing or by the use of threaded fasteners such as screws or bolts at the stud bottom ends 32. The sole plate 20 is horizontally oriented, and the studs 22 are vertically oriented. A top plate 24 is fastened in the same manner to the stud top ends 30 of studs 22. The top plate 24 is horizontally oriented, and parallel to the sole plate 20. All studs 22, the sole plate 20, and the top plate 24 are made from fiber-reinforced cellular concrete, which will be discussed in more detail below.

Once the frame assembly 10 is completed, insulation 26 can be installed between the studs 22, and wallboard 28 can be applied to the frame assembly 10 using the same techniques as are used for wood lumber wall assemblies.

Figure 2:
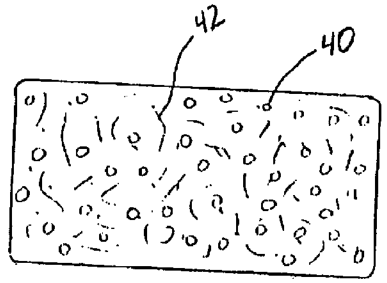
FIG. 2 shows a schematic cross section of a 2×4 product illustrated in FIG. 1.

FIG. 2 illustrates a schematic cross-section of a piece of dimensional lumber formed from fiber-reinforced cellular concrete, such as a 2×4 that would be used to construct the frame assembly 10 of FIG. 1. The cross-section shows a random distribution of voids 40 formed in the concrete. The cross-section also shows the randomly oriented and randomly distributed fibers 42 in the concrete.

Figure 3:
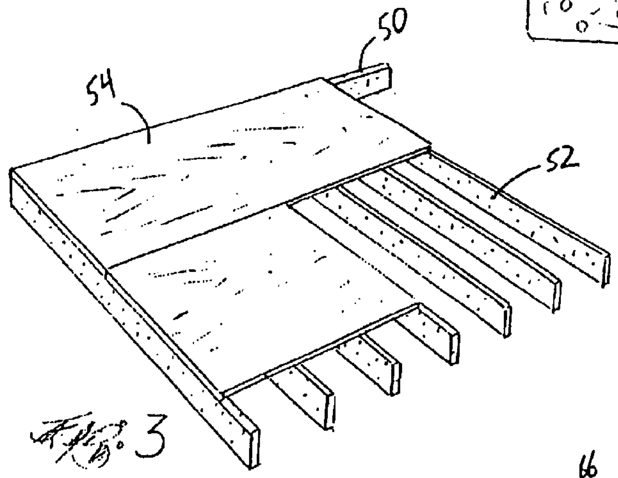
FIG. 3 shows a floor system embodying the invention.

FIG. 3 illustrates a frame assembly for use as a structural component of a building, such as a floor.

The frame assembly includes a plurality of joists 52 that are spaced-apart and parallel and fastened to end plates 50 by nailing or by the use of threaded fasteners such as screws or bolts at both ends of joists 52. Both end plates 50 and all of the joists 52 are horizontally oriented, with the two end plates 50 parallel to each other and the joists 52 oriented perpendicularly to both end plates 50. In one embodiment of the invention, the joists 52 and end plates 50 are nailed together in the same way as wood lumber members are nailed together. All joists 52 and both end plates 50 are made from fiber-reinforced cellular concrete, which will be discussed in more detail below.

Once the frame assembly is completed, floor boards 54 can be applied to the frame assembly. The floor boards 54 can be nailed or secured by screws to the frame assembly.

Figure 4:
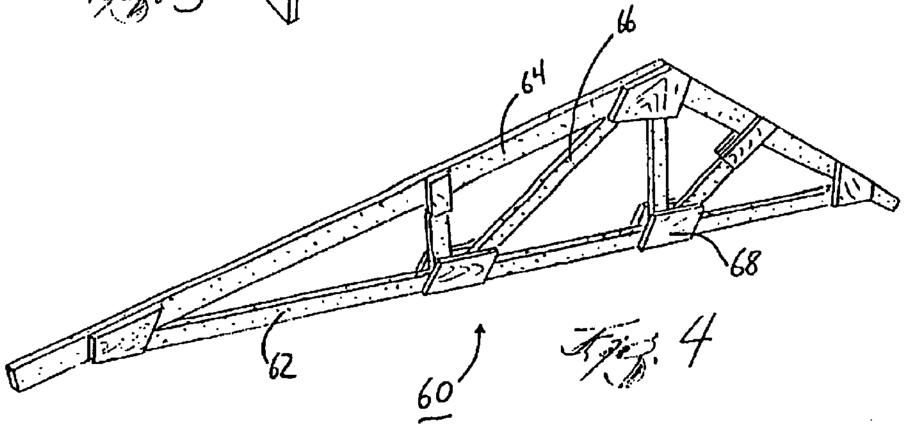
FIG. 4 shows a roof truss assembly embodying the invention.

FIG. 4 illustrates a frame assembly for use as a structural component of a building, such as a roof truss 60.

The frame assembly includes a lower chord 62 that forms the base for the roof truss 60. With the lower chord 62, the two upper chords 64 form a generally A-shaped assembly. Connecting members 66 are disposed between and fastened to the lower chord 62 and the upper chords 64 to provide additional structural strength. The lower chord 62, upper chords 64, and connecting members 66 are fastened by nailing or by the use of threaded fasteners such as screws or bolts. Additionally, all joints are reinforced using plate-type gussets 68. The lower chord 62, upper chords 64, and connecting members 66 are made from fiber-reinforced cellular concrete, which will be discussed in more detail below. In one embodiment of the invention, the lower chord 62, upper chords 64, and connecting members 66 are nailed together in the same way as wood lumber members are nailed together.

The uses of this invention are not limited to those described. HPFRCC dimensional lumber members and the methods disclosed herein may be used in the fabrication of pallets, fencing, decking, shelving, and any other products that can be fabricated from wood lumber.

Figure 5:
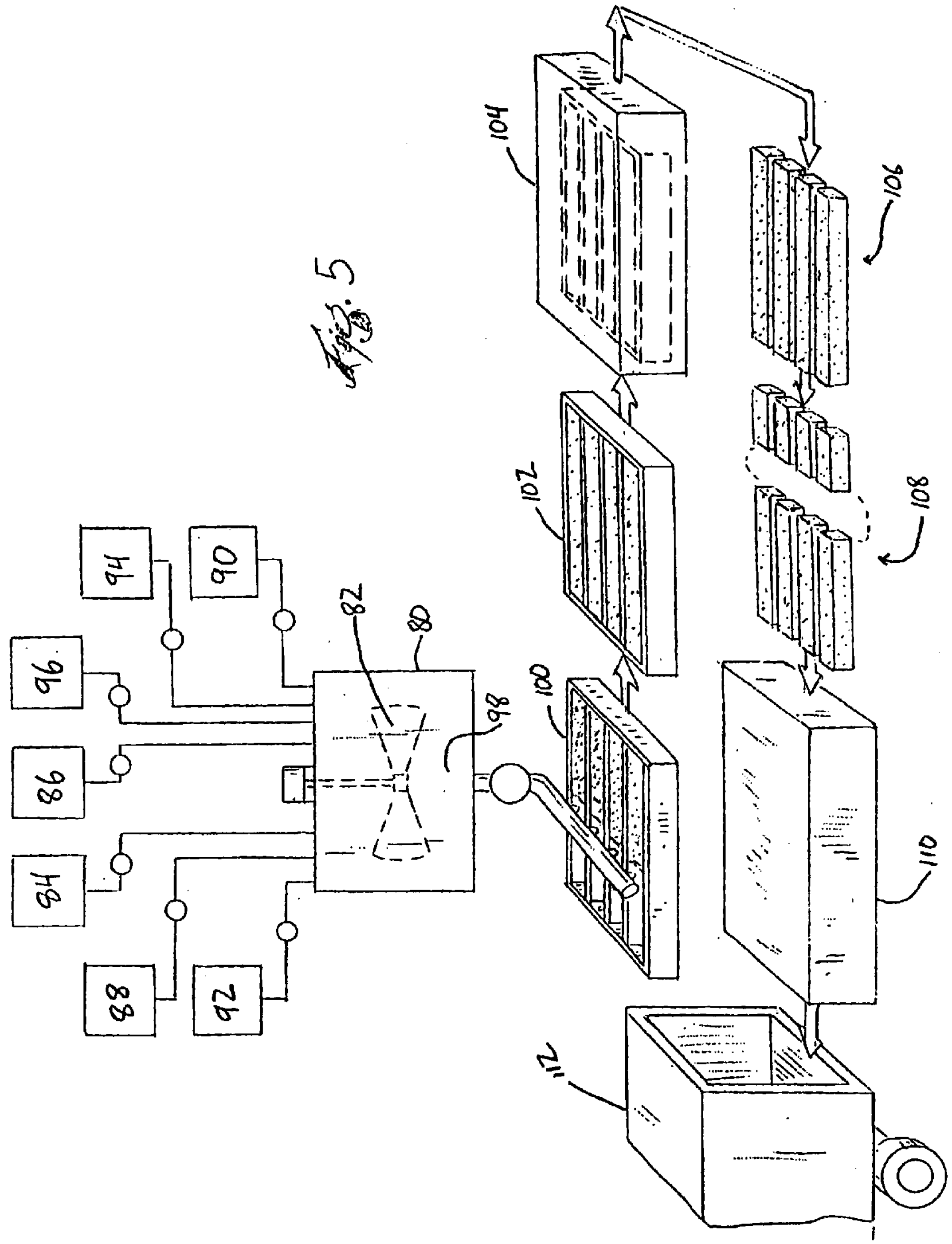
FIG. 5 is a schematic of a method for manufacturing fiber reinforced cellular concrete embodying the invention.

FIG. 5 illustrates a process for manufacturing lumber products from fiber-reinforced cellular concrete. The following components are mixed in a tank 80 containing a high-speed mixer 82.

Portland Cement 84—In general, Type I cement can be used. However, other cement types can also be used to achieve particular properties.

Flyash 86—Flyash is a waste product (or byproduct) resulting from the burning of coal in power plants. It has cementitious properties, but is lighter than cement. Class F Flyash is used. However, other types of flyash and other pozzolans (such as silica fume) can also be used separately or in combination with each other.

Water 88—Potable water should be used. Any water that is deleterious to conventional concrete would also be unsuitable for this application.

Fiber 90—Many types of fibers for use in concrete are commercially available (carbon, polypropylene, alkali-resistant glass, cellulose, etc.) and can be used in this application. The type and amount of different fibers depend on the desired strength properties ("structural" or "non-structural") and the nailability of the product. The type of fiber used not only affects the amount of fiber required, but also impacts proportioning and choice of other mix ingredients. The ability to properly disperse the fibers within the mix is another important consideration. Due to cost, stiffness, and strength considerations, polypropylene fibers are used in the developed structural products. Monofilament and fibrillated fibers are commercially available.

Superplasticizer 92—A high range water-reducing admixture or superplasticizer 92 is used to improve workability of the mix.

Aerating compound 94—Aluminum powder is used to aerate the mixture. The fineness of powder should be appropriate for production of cellular concrete. Foams or other compounds capable of introducing air bubbles in concrete can be used in lieu of aluminum powder.

Color pigments 96 if a colored product is desired—A large selection of color pigments is commercially available from suppliers such as Davis Colors of Los Angeles, Calif. These pigments can be used to introduce the desired colors throughout the product. Alternatively, surface color can be applied at the end of production by immersion in a paint bath or by brushing. Although the permeability of the developed products is very low, sealers can also be applied to the surface in this manner if desired, especially in outdoor applications.

The mix design must consider the impact of different materials on the resulting properties of the concrete.

In other embodiments, sand or a variety of lightweight sands can also be used. However, the inclusion of sand will alter the resulting properties of concrete lumber members including their compressive strength. If used, silica sand can reduce the working life of many conventional saw cutting blades.

The mixing process involves mixing flyash 86 and part of the water 88, and sand if used, followed by the introduction of cement 84 and color pigments 96 if used. Additional water 88 and superplasticizer 92 are added to achieve the desired workability. Then, fibers 90 are introduced and mixed thoroughly with a high-speed mixer 82 while the remainder of the water 88 and superplasticizer 92 is introduced. Finally, aluminum powder 94 is added and mixed thoroughly with the high-speed mixer 82.

The concrete mixture 98 is placed in forms 100 to a height below the final desired level. The action of the aluminum powder 94 raises the level of concrete mixture 98 above the final desired level. The excess concrete mixture 98 is then removed 102, and the products are prepared for curing 104. Autoclaving is not required, but accelerated curing procedures may be used. In general, moist curing or steam curing followed by air curing will be used. The method of curing 104 will be based on a number of currently-available methods for curing concrete, and will be dependent on the time requirements to achieve the necessary concrete properties, mainly compressive strength. After an initial period of curing 104, the products will be demolded 106, cut to desired dimensions 108, and further cured 110. The products can then be shipped 112 as desired.

Other production alternatives exist. For example, a large block of concrete can be cast. Then, after the initial set is achieved, the block can be cut into the desired sizes using tensioned wires or high-temperature wires before proceeding with the curing processes. This process is generally used in the production of cellular concrete blocks. In another method, an extrusion process may be used for direct production of the desired sizes in lieu of the method of casting in forms. In this case, a foaming agent is introduced into the mix, and the low-slump mix is fed into the extrusion process.

Currently, there are many fabrication plants that, based on individual building drawings, pre-fabricate wood-framed building panels including walls and floors for transportation and erection at the site. Similar work can be performed with this set of products. In fact, fabrication and assembly can be either as individual members assembled together as done in the case of wood, or concrete placement and fabrication for the entire framing panel can be made in one operation. Forming and wire cutting processes may be used. Also, additional internal and external reinforcement can be placed in the connection zones to further improve seismic resistance in areas with risk of significant earthquakes.

The design load capacities for various grades and types of lumber products are provided in the "National Design Specification for Wood Construction and Supplement" published by the American Forest and Paper Association in Washington, D.C. These safe load capacities include inherent safety factors based on the likelihood of flaws or defects or construction deficiencies. The ACI 318 Code for reinforced concrete requires a load factor of 1.4 for dead load and 1.7 for live load with a reduction factor of 0.9 for flexure and 0.85 for shear. This results in an effective safety factor of 1.54 for dead load and 1.87 for live load (both for flexure). The "Recommended Practice for Autoclaved Aerated Concrete" published by RILEM recommends a safety factor of 1.8 for flexure in cellular concrete. RILEM, the International Union of Testing and Research Laboratories for Materials and Structures, is located in France. Considering that the new class of products (HPFRCC) discussed here is technically a type of cellular concrete, it is reasonable and conservative to adhere to the currently-existing safety factors for cellular concrete (i.e. 1.80). The safety factors apply to the ultimate strength of the product in compression, tension, flexure, and shear. It is also appropriate to include a second serviceability limit state criterion against flexural cracking (i.e. allowable stresses must be less than the stress at first crack). For this set of products, a factor of safety of 1.25 against flexural cracking is proposed (similar to that existing for prestressed concrete in ACI 318) in addition to a factor of safety of 1.80 against failure.

The type and quantities of different materials, production processes, and curing methods affect the properties of the resulting product. The following ranges for the quantities of various products (as a percentage of total weight) can be used to achieve a wide range of properties for both structural and non-structural product grades:

| | |
|---|---|
| Portland Cement: | 18%–40% |
| Flyash (Class F): | 0%–40% |
| Sand: | 0%–40% |
| Water: | 20%–27% |
| Polypropylene Fiber (Monofilament): | 0.4%–3.2% |
| Superplasticizer: | 0%–0.6% |
| Aluminum Powder: | 0.012%–0.048% |
| Color Pigment: | 0%–3.5% |

EXAMPLE I

The following mix proportions with a combination of moist or steam and air curing will result in minimum service load design (safe) stresses of 700 psi flexure, 900 psi compression, and 100 psi shear (all based on 28-day strengths). These safe load capacities exceed comparable values for typical STUD grade lumber specified in the National Design Specification for Wood Construction.

| | weight % |
|---|---|
| Portland Cement (Type I): | 36.3 |
| Flyash (Class F): | 36.3 |
| Water: | 23.95 |
| Polypropylene Fiber (Fibermesh fiber from Fibermesh, Chattanooga, TN ½ in. long, Monofilament): | 1.6 |
| Aluminum Powder: | 0.02 |
| Superplasticizer (WRDA 84): | 0.44 |
| Color Pigment, if used: | 1.5 |

The above mixture will result in a minimum 28-day compressive strength of 2000 psi, minimum flexural strength of 1300 psi (based on moment strength and uncracked section properties), a minimum first crack of 900 psi, a density of 75 lb. per cubic foot, and conventional nail pull-out capacities comparable to STUD grade lumber (per the Uniform Building Code tables). It should be noted that the compressive strength of the HPFRCC is expected to increase substantially as the concrete ages beyond 28 days. This is due to the presence of a large amount of flyash in the mix.

For the non-structural product grade, the quantities of cement and fibers can be reduced, while sand or lightweight sand can be used to replace part or all of the flyash. To reduce the weight of the product, the amount of aluminum powder can be increased. This will, however, reduce the compressive strength of the product.

In general, the advantages of the products embodying the invention can be summarized as follows. These products can be made in a variety of sizes and shapes including all dimensional lumber shapes. These products can be made in different colors and lengths. Lumber prices increase substantially with increased length. However, these products can be made in very long lengths without a major cost premium. These products can be made with sufficient strength parameters to serve as structural members and directly replace dimensional lumber in wall, floor, decking, and other applications. These products are nailable using common nails with nail pull-out capacities comparable to conventional lumber. These products are sawable using hand saws and a variety of electric saws commonly used for conventional lumber. They can also be drilled. These products have excellent insulation properties and have very low water permeabilities. The toughness and ductility of these products are better than conventional concrete or wood. These products do not suffer from common wood defects such as knots. Through proper production and quality control procedures, they can be made free of concrete defects such as honeycombs. These products are lightweight concrete with a maximum weight of approximately half the weight of conventional concrete. These products are not susceptible to attack by harmful insects or parasites such as termites. These products are fire resistant. These products could make available highly-efficient wood-frame-type housing in areas of the world not possessing forest resources, such as desert areas. These lighter and more ductile structures offer a number of advantages including better resistance to seismic events. These products can positively impact the environment by substantially reducing dependence on the world's environmentally-crucial forest resources while using a large quantity of waste products such as flyash. These products offer new possibilities regarding pre-fabricated panels for assembly at the building site. These products allow new architectural design possibilities through the use of colors and the ability to create members with different surface finishes by using textured forms, for example.

While a preferred embodiment of the invention has been disclosed, by way of example, various obvious modifications will become apparent to those skilled in the art. Thus, the scope of the invention should be limited to only by the spirit and scope of the following claims.

Figure 6:
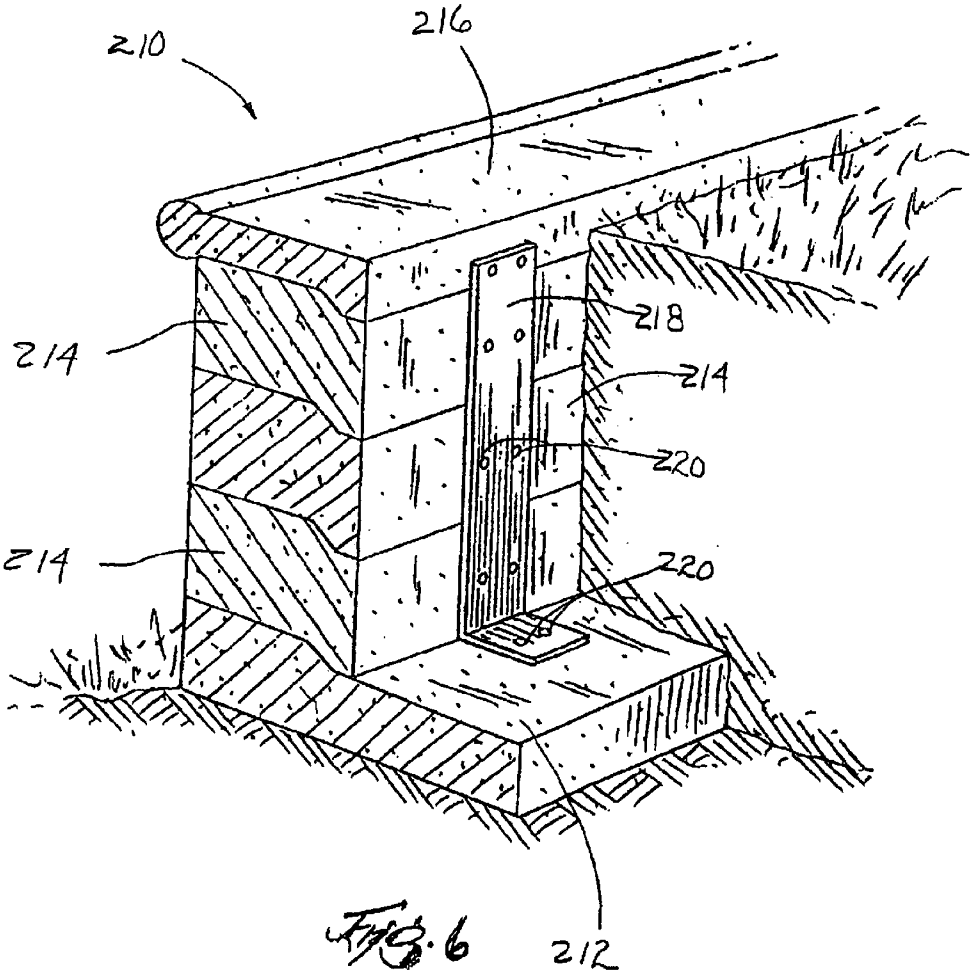
FIG. 6 is a perspective view illustrating an externally reinforced retaining wall of the present invention.
Figure 7:
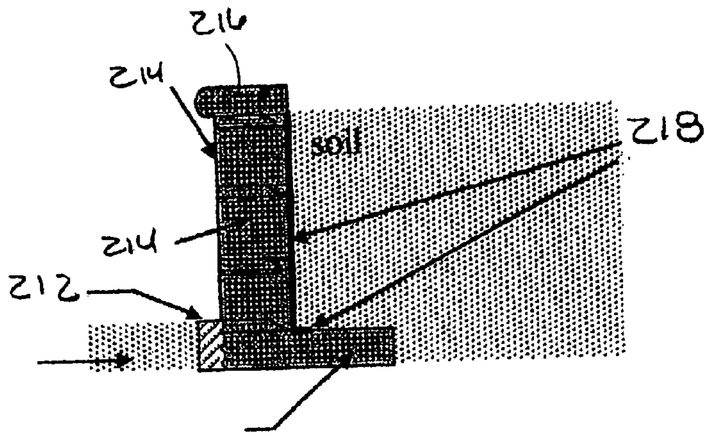
FIG. 7 is a side view illustrating the retaining wall shown in FIG. 6.
Figure 8:
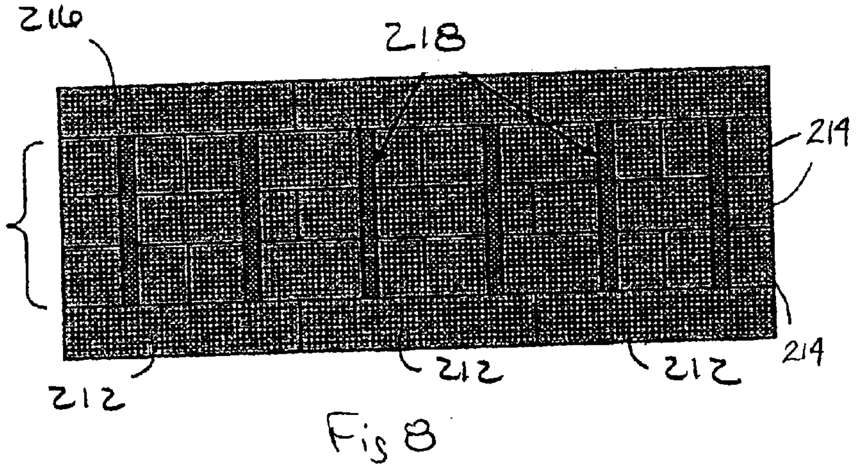
FIG. 8 is a rear view illustrating the retaining wall shown in FIG. 6.

The invention also includes an externally reinforced retaining wall system 210 shown in FIGS. 6–8 and used in constructions in landscaping for the purpose of retaining soil, protecting natural and artificial structures, and increasing land use. The retaining wall system 210 includes a base block 212 that is in contact with a ground surface, a number of main blocks 214 stacked above the base block 212, and a cap block 216 stacked above the main blocks 214. The retaining wall system 210 also includes a reinforcing strip 218 that is fastened to the blocks 212, 214, 216 to secure the blocks 212, 214, 216 in the stacked condition.

Figure 9:
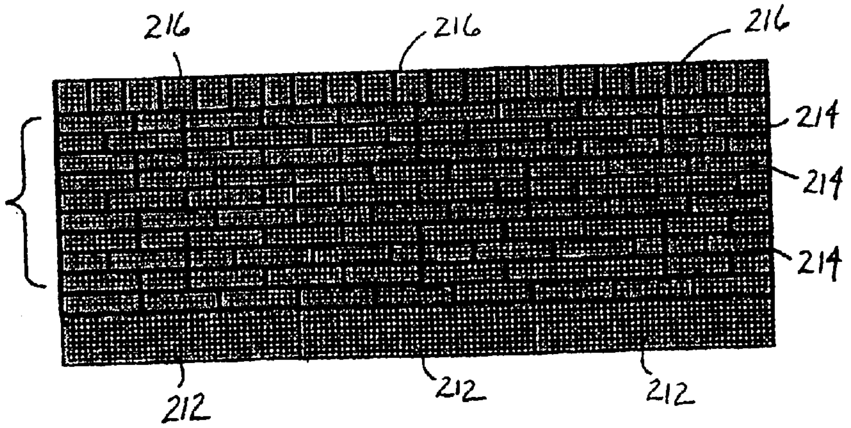
FIG. 9 is a front view illustrating the retaining wall shown in FIG. 6, showing decorative front faces.
Figure 10:
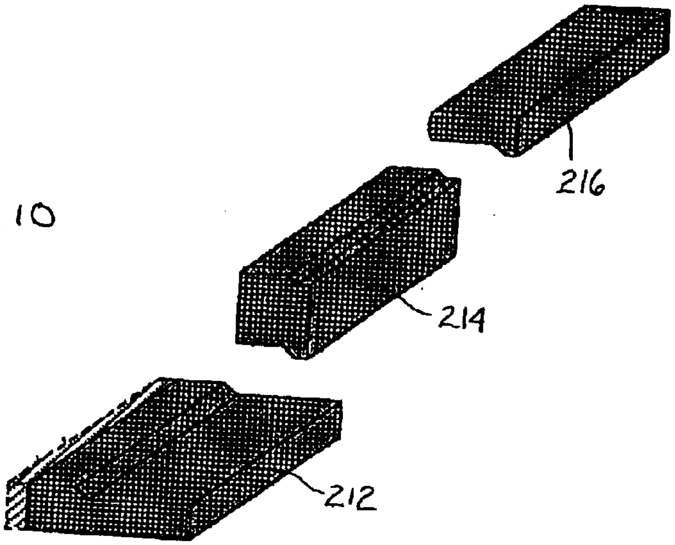
FIG. 10 is an exploded view illustrating a portion of the retaining wall shown in FIG. 6.

As shown in FIGS. 9–10, the rectangular base block 212 is generally larger than the main blocks 214 and includes a decorative front face. The base block 212 is positioned directly on a prepared gravel bed that is placed over soil that has been compacted to prevent the retaining wall system 210 from settling. The top face of the base block 212 is configured to interlock with a bottom face of a main block 214 that is stacked directly above it such that the interlock between the two blocks 212, 214 resists the sliding forces applied to the blocks 212, 214 from the backfill.

The rectangular main blocks 214 can include decorative front faces and are stacked above the base block 212 to achieve a desired height of the retaining wall. Typically, more than one main block 214 is used in constructing the retaining wall system 210, however a single main block 214 may be used while not departing from the scope of the present invention. The bottom face of the main block 214 is configured to interlock with either the top face of the base block 212 or the top face of another main block 214. The top face of the main block 214 is configured to interlock with the bottom face of another main block 214 or the bottom face of a cap block 216.

The cap block 216 is rectangular and is generally smaller than the main block 214. The cap block 216 is stacked above the uppermost main block 214 and provides the top layer of the retaining wall system 210. The top face as well as the front face are exposed on the stacked retaining wall system 210 and therefore these faces are configured to have an improved aesthetic appearance. All of the decorative faces of the blocks 212, 214, 216 may be patterned and colored with various integrated colors.

The blocks 212, 214, 216 are made from the high-performance fiber-reinforced cellular concrete material as fully described above. As previously described, this material is workable similar to wood such that it can be saw cut and fastened by common fasteners such as nails and screws.

The blocks 212, 214, 216 can alternatively be made by a similar material that includes high carbon fly ash in lieu of Class C or Class F fly ash. These high carbon ashes are not used in conventional concrete because they have a higher water demand and reduce the effectiveness of some admixtures. However, the cementitious material remains effective despite using a large amount of these high carbon ashes (approximately one-third of the entire mass of the product). As an alternative to fly ash, other pozzolans can be used such as cement kiln dust ("CKD"), which is a by-product from the production of Portland cement.

The reinforcing strip 218 preferably has a basic rectangular cross section and may include channels or angles to provide extra support. The reinforcing strip 218 includes a plurality of holes 220 that are aligned such that fasteners may be inserted through the holes 220 and into the back faces of the cap block 216 and the main blocks 214. The width of the reinforcing strip and the arrangement and number of holes can be varied without departing from the scope of the invention. The reinforcing strip 218 is preferably bent 90 degrees to transition from the lowest main block 214 onto the top surface of the base block 212. A similar fastener is inserted into the hole 220 of the reinforcing strip 218 and into the top surface of the base block 212.

Although a single reinforcing strip 218 is preferably used to secure a single stack of blocks 212, 214, 216, multiple reinforcing strips 218 may be used to secure a single stack without departing from the scope of the invention. In addition, reinforcing strips 218 may be used to couple together adjacent stacks of blocks 212, 214, 216 in the horizontal direction.

The reinforcing strip 18 is corrosion resistant and is sufficiently strong and rigid to provide the required stability to the retaining wall system 210. The reinforcing strip 218 can be made from a stainless steel or from Fiber-Reinforced Polymers ("FRP"). FRP materials include a variety of fibers such as carbon, glass, aramid and the like. Galvanized steel reinforcements can also be used, however the sacrificial nature of the zinc coating in galvanized members may be unsuitable for long-term durable service. Stainless steel screws, nails or other corrosion resistant fasteners are used to fasten the blocks 212, 214, 216 to the reinforcing strip 218.

The externally reinforced blocks 212, 214, 216 of the retaining wall system 210 provide the strength and stability to secure the blocks 212, 214, 216 within the stack, however the overall stability of the wall must be assured by providing the base block 212 with a large "foot print" such that a portion of the backfill soil is compacted over the enlarged top face. The weight of the soil over the base block 212 assists in resisting the overturning moment and sliding forces acting on the retaining wall system 210. The retaining wall system 210 of the present invention can also be adapted to reinforce the soil behind the wall by using conventional geosynthetic fabrics.

Figure 11:
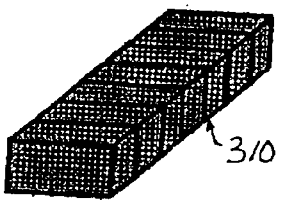
FIG. 11 is a perspective view illustrating a landscaping timber made from cementitious material.
Figure 12:
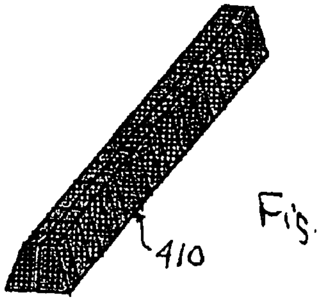
FIG. 12 is a perspective view illustrating a car stop made from cementitious material.
Figure 13:
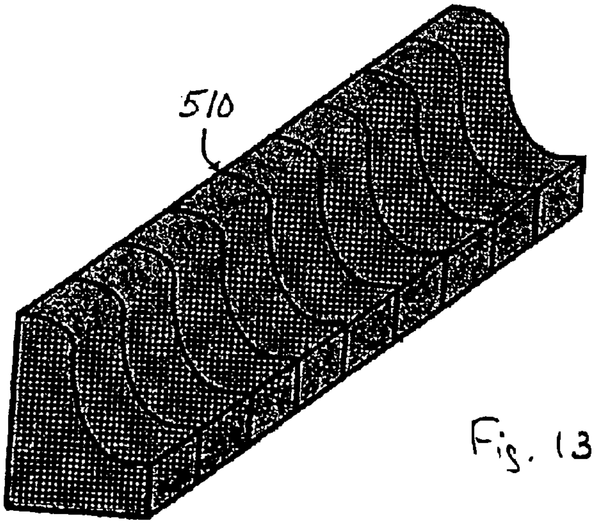
FIG. 13 is a perspective view illustrating a landscape edging made from cementitious material.

The cementitious materials presented in this application can be used in other applications such as the one's illustrated in FIGS. 11–13. FIG. 11 illustrates a decorative landscaping timber 310, FIG. 12 illustrates a car stop 410, and FIG. 13 illustrates a landscape edging 510. Further examples include building facades, pavers for walkways and driveways, decking planks, partition wall panels in building, brick paneling, load bearing walls, steps, brick pilasters or pillars, shipping pallets, railroad ties, playground equipment, barbecue grill casing, fencing, decorative concrete, barriers, energy or impact absorption systems, and many others. If necessary, these products can be easily fastened together using connecting metal strips and screws as described above with respect to the retaining wall.

I claim:

1. A lumber product for use in building construction, the lumber product comprising fiber-reinforced cellular concrete made from a cementitious material, water, fiber, and an aerating material, made to form a load-bearing product having the strength, durability, nailability, and sawability for direct substitution for dimensional wood lumber in wood-frame construction applications, wherein the cementitious material makes up approximately 18–83% of the total weight of the lumber product, the water makes up approximately 20–30% of the total weight of the lumber product, the fiber makes up approximately 0.4–4% of the total weight of the lumber product, and the aerating material makes up approximately less than 1% of the total weight of the lumber product.

2. The lumber product of claim 1, wherein the cementitious material is selected from the group consisting of: flyash and cement.

3. The lumber product of claim 1, wherein the aerating compound is selected from the group consisting of: aluminum powder and a foaming agent.

4. The lumber product of claim 1, wherein the fiber is selected from the group consisting of: carbon, polypropylene, alkali-resistant glass, and cellulose.

5. The lumber product of claim 1, wherein the cementitious material comprises cement, fly ash and silica fume or other pozzolans, and wherein the cement makes up approximately less than about 40% of the total weight of the lumber substitute product, the fly ash makes up approximately less than about 50% of the total weight of the lumber substitute product, and the silica fume or other pozzolans makes up approximately less than about 25% of the total weight of the lumber substitute product.

6. The lumber product of claim 1, wherein the lumber product includes a minimum compressive strength of 2000 psi.

7. The lumber product of claim 6, wherein the lumber product includes a minimum flexural strength of 1300 psi.

8. A lumber substitute product for use in building construction, the lumber substitute product comprising fiber-reinforced cellular concrete made from cement which makes up approximately 18–40% of the total weight of the product, fly ash which makes up approximately less than about 50% of the total weight of the product, silica fume or other pozzolans which makes up approximately less than about 25% of the total weight of the product, water which makes up approximately 20–30% of the total weight of the product, fiber which makes up approximately 0.4–3.2% of the total weight of the product, and an aerating material, wherein the product has the strength, durability, nailability, and sawability for direct substitution for dimensional wood lumber in wood-frame construction applications.

9. The lumber substitute of claim 8, further comprising sand which makes up approximately less than about 40% of the total weight of the product.

10. The lumber substitute of claim 8, further comprising a water-reducing admixture which makes up approximately less than about 0.6% of the total weight of the product.

11. The lumber substitute of claim 8, further comprising a color pigment which makes up approximately less than about 3.5% of the total weight of the product.

12. The lumber substitute product of claim 8, wherein the aerating material is selected from the group consisting of aluminum powder and a foaming agent.

13. The lumber substitute product of claim 8, wherein the aerating material is an aluminum power which makes up about 0.012–0.048% of the total weight of the product.

14. The lumber substitute product of claim 8, wherein the fiber is selected from the group consisting of carbon, polypropylene, alkali-resistant glass, cellulose, nylon, aramid, acrylic, polyethylene, polyvinyl alcohol and polyolefin.

15. The lumber substitute product of claim 8, wherein the lumber substitute product includes a minimum compressive strength of 2000 psi.

16. The lumber substitute product of claim 15, wherein the lumber substitute product includes a minimum flexural strength of 1300 psi.

* * * * *